(12) United States Patent
Sankai

(10) Patent No.: US 9,327,398 B2
(45) Date of Patent: May 3, 2016

(54) ROTATION ADJUSTMENT APPARATUS AND METHOD OF CONTROLLING ROTARY APPARATUS

(75) Inventor: Yoshiyuki Sankai, Ibaraki (JP)

(73) Assignee: University of Tsukuba, Ibaraki (JP)

( * ) Notice: Subject to any disclaimer, the term of this patent is extended or adjusted under 35 U.S.C. 154(b) by 865 days.

(21) Appl. No.: 12/679,856

(22) PCT Filed: Sep. 27, 2007

(86) PCT No.: PCT/JP2007/068751
§ 371 (c)(1),
(2), (4) Date: May 6, 2010

(87) PCT Pub. No.: WO2009/040908
PCT Pub. Date: Apr. 2, 2009

(65) Prior Publication Data
US 2010/0217163 A1 Aug. 26, 2010

(51) Int. Cl.
*A61H 1/00* (2006.01)
*B25J 9/00* (2006.01)
*A61H 1/02* (2006.01)

(52) U.S. Cl.
CPC ............... *B25J 9/0006* (2013.01); *A61H 1/02* (2013.01); *A61H 2201/165* (2013.01)

(58) Field of Classification Search
CPC .... A61H 1/02; A61H 2201/165; B25J 9/0006
USPC ........... 601/5, 23, 24, 26, 33; 623/24, 31, 43, 623/45, 57–60; 602/16, 20, 21
See application file for complete search history.

(56) References Cited

U.S. PATENT DOCUMENTS

| | | | | |
|---|---|---|---|---|
| 5,031,606 A | * | 7/1991 | Ring, Sr. | 602/16 |
| 5,052,375 A | * | 10/1991 | Stark et al. | 601/34 |
| 5,088,731 A | * | 2/1992 | Carpenter | 601/33 |
| 5,417,643 A | * | 5/1995 | Taylor | 601/33 |

(Continued)

FOREIGN PATENT DOCUMENTS

| | | |
|---|---|---|
| JP | H03-60991 A | 3/1991 |
| JP | H05-23993 A | 2/1993 |

(Continued)

OTHER PUBLICATIONS

English translation of the International Preliminary Report on Patentability and Written Opinion of the International Searching Authority with mailing date of Apr. 15, 2010; International Application No. PCT/JP2007/068751.

(Continued)

*Primary Examiner* — Quang D Thanh
(74) *Attorney, Agent, or Firm* — Studebaker & Brackett PC

(57) ABSTRACT

It is an object of the present invention to reduce energy consumed when a rotary apparatus is used and to suppress abrasion and breakage on the rotary apparatus and a driving apparatus which drives the rotary apparatus. Provided is a rotation adjustment apparatus (1) comprising a rotary apparatus (10) which has a plurality of members coupled to each other via a plurality of rotation axes, the rotary apparatus providing a rotational movement of one of the members rotating around the rotation axis with respect to another one of the members; and a rotation restraining mechanism (30, 72) which restrains at least one of a plurality of rotational movements provided by the rotary apparatus.

4 Claims, 9 Drawing Sheets

(56) References Cited

U.S. PATENT DOCUMENTS

| | | | |
|---|---|---|---|
| 6,301,526 B1 | 10/2001 | Kim et al. | |
| 6,423,098 B1 | 7/2002 | Biedermann | |
| 8,057,410 B2 * | 11/2011 | Angold et al. | 601/5 |
| 2006/0064047 A1 | 3/2006 | Shimada et al. | |
| 2006/0270951 A1 | 11/2006 | Ikeuchi | |
| 2007/0225620 A1 * | 9/2007 | Carignan et al. | 601/5 |
| 2008/0114272 A1 * | 5/2008 | Herr et al. | 623/24 |
| 2008/0161937 A1 | 7/2008 | Sankai | |
| 2008/0234608 A1 | 9/2008 | Sankai | |
| 2012/0179075 A1 * | 7/2012 | Perry et al. | 601/33 |

FOREIGN PATENT DOCUMENTS

| | | |
|---|---|---|
| JP | H06-198587 A | 7/1994 |
| JP | 2000-51289 A | 2/2000 |
| JP | 2001-511052 A | 8/2001 |
| JP | 2004-174004 A | 6/2004 |
| JP | 2004-174007 A | 6/2004 |
| JP | 2005-224921 A | 8/2005 |
| JP | 2005-230099 A | 9/2005 |
| JP | 2005-253650 A | 9/2005 |
| JP | 2006-115971 A | 5/2006 |
| JP | 2006-204426 A | 8/2006 |
| JP | 2006-326185 A | 12/2006 |
| JP | 2007-000616 A | 1/2007 |
| JP | 2007-029113 A | 2/2007 |
| JP | 2007-054616 A | 3/2007 |
| JP | 2007-097636 A | 4/2007 |
| JP | 2007-130234 A | 5/2007 |
| WO | 2004/058458 A1 | 7/2004 |

OTHER PUBLICATIONS

International Search Report; PCT/JP2007/068751; Jan. 8, 2008.

* cited by examiner

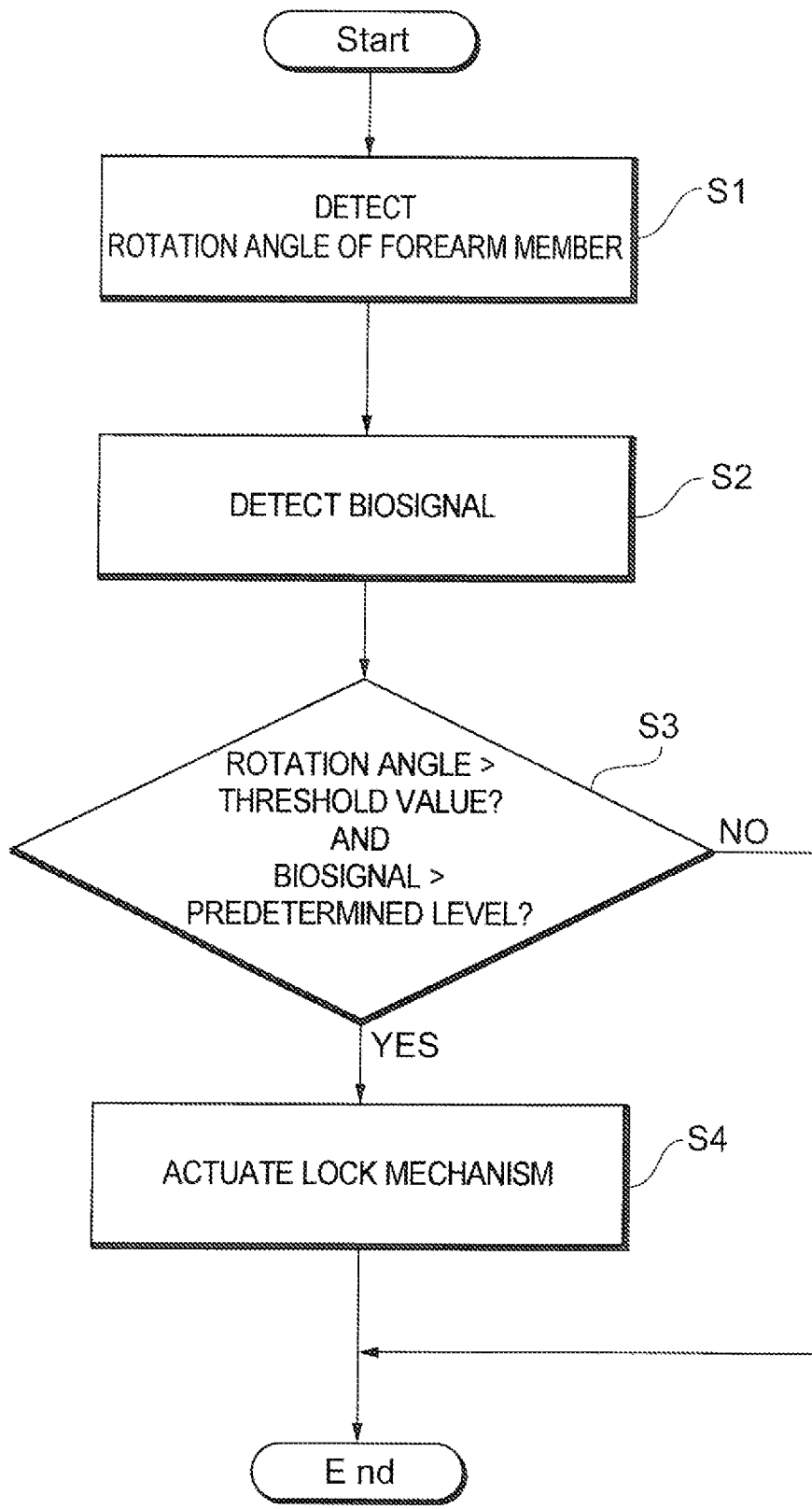

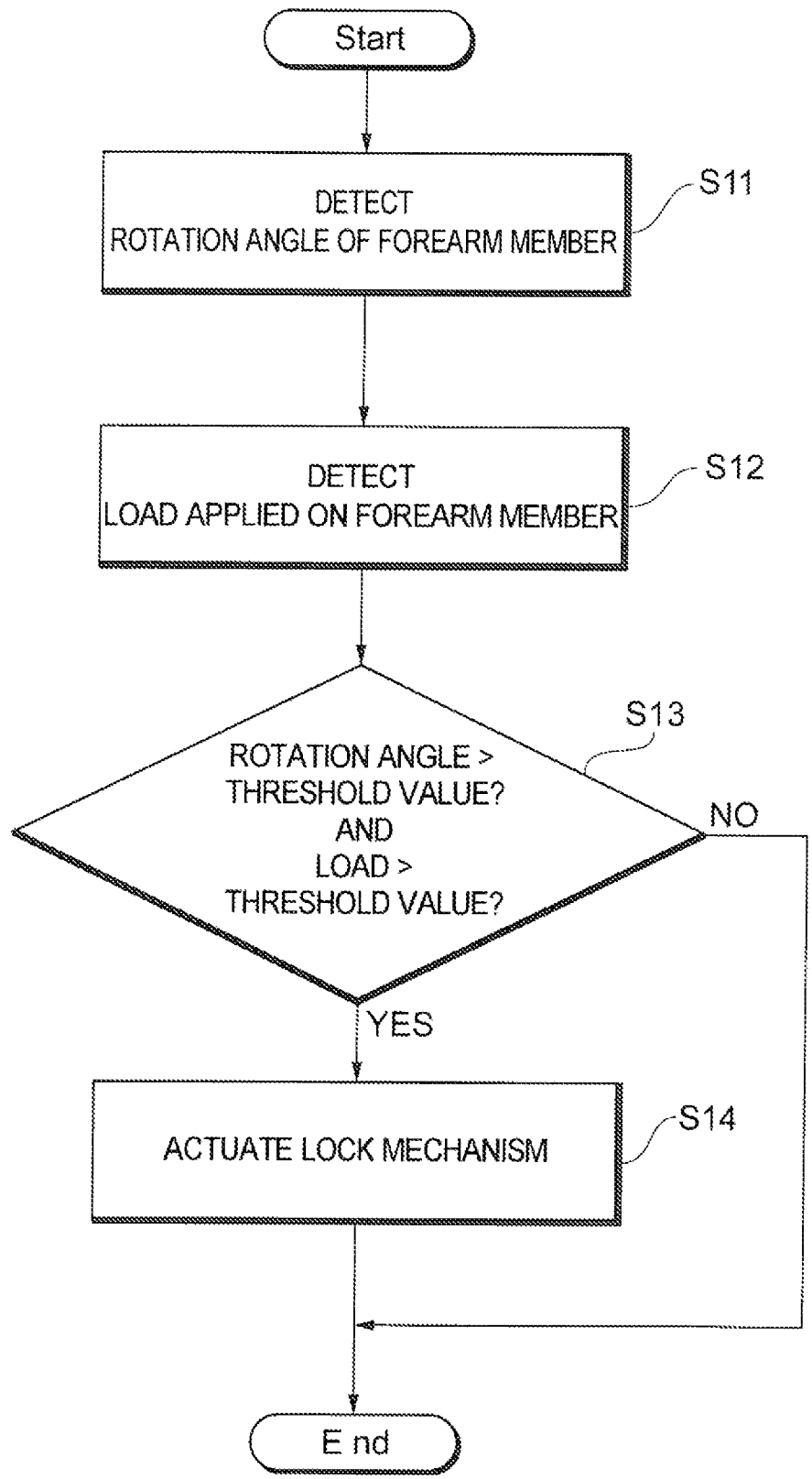

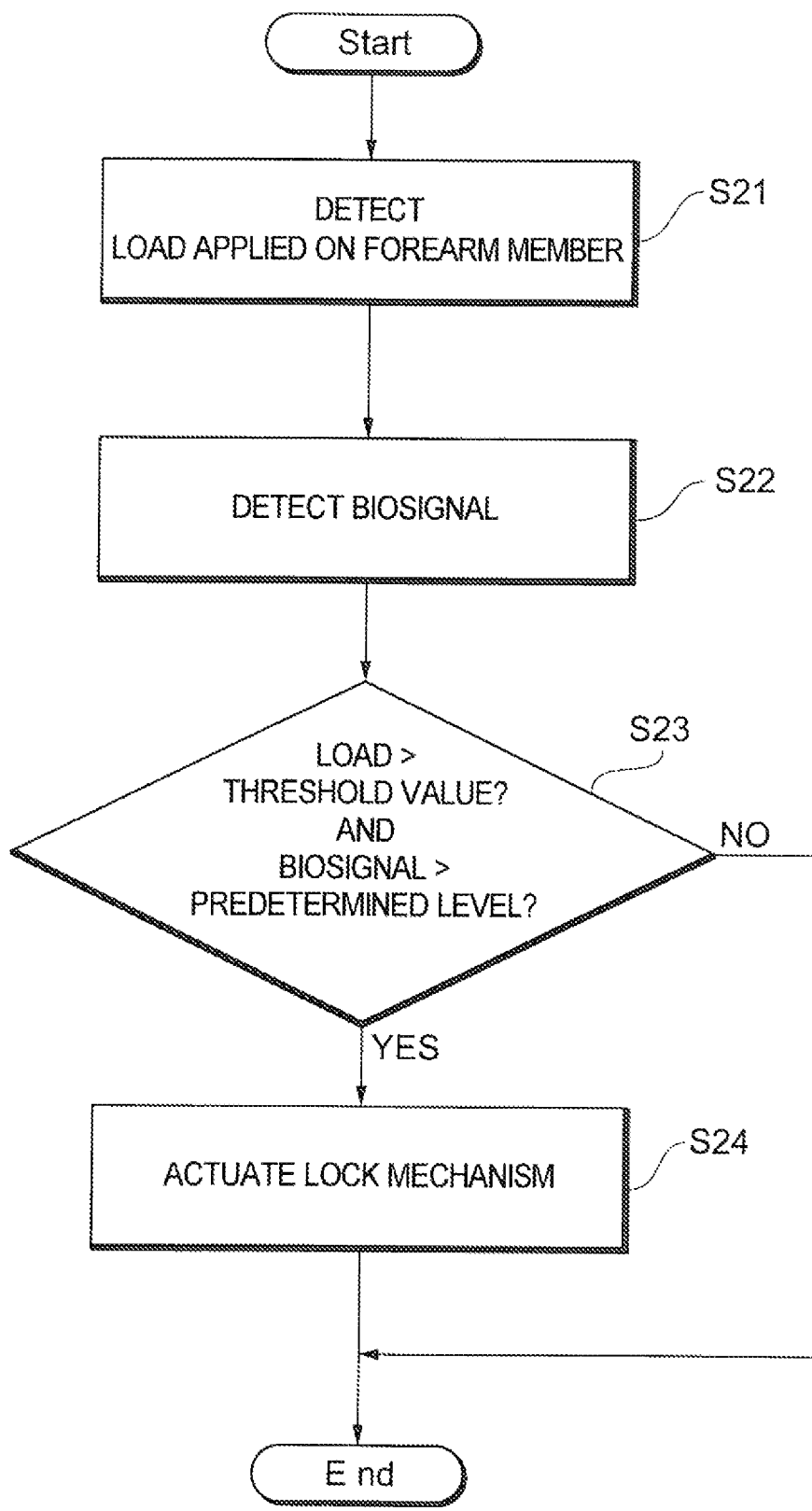

ROTATION ADJUSTMENT APPARATUS AND METHOD OF CONTROLLING ROTARY APPARATUS

FIELD OF THE INVENTION

The invention relates to a rotation adjustment apparatus and a method of controlling a rotary apparatus.

BACKGROUND OF THE INVENTION

Recently, developments have been promoted for power assist apparatuses which assist motions of, for example, physically challenged people who have lost their muscle forces and elderly people whose muscle forces have decreased (hereinafter referred to as the "person/people to be assisted") or which make motions of the people to be assisted instead of those people. These days, a wearable motion assisting apparatus has been proposed which is capable of being worn on a person to be assisted and generating a necessary motive power at any time based on an intention of the person to be assisted (see, for example, Japanese laid-open patent publication No. 2005-253650).

The wearable motion assisting apparatus includes a motion assisting wearing device which is to be worn on an arm or a leg of a person to be assisted. An example of a motion assisting wearing device, which has been proposed, includes: a trunk member which is to be worn on a part near a shoulder; an upper arm member which is coupled to the trunk member via a shoulder joint mechanism having at least one rotation axis and which is to be worn on an upper arm of a wearer; and a forearm member which is coupled to the upper arm member via an elbow joint mechanism having at least one rotation axis and which is to be worn on a forearm of the wearer. Such a motion assisting wearing device provides a rotation of the upper arm member with respect to the trunk member and a rotation of the forearm member with respect to the upper arm member, and provides such rotational movements using a motive power generated by a driving apparatus (actuator) provided in the joint mechanisms. A person who wears the motion assisting wearing device (wearer) can hold a relatively heavy object utilizing the motive power of the driving apparatus.

DISCLOSURE OF THE INVENTION

Problem to be Solved by the Invention

However, if a wearer tries to hold a relatively heavy object utilizing the above-mentioned motion assisting wearing device in the related art, a specific amount of electrical power must be continued to be supplied to the driving apparatus (actuator). Accordingly, if the object is held for a long time, a large amount of electrical power is consumed, and in addition, the driving apparatus which drives the motion assisting wearing device might become fatigued (abraded or broken) and the lifetime thereof might be shortened.

Also, if it becomes impossible for the driving performance of the driving apparatus which drives the motion assisting wearing device to be adjusted due to a certain factor (e.g., the shut-off of power supply) in the state where the wearer is holding an object utilizing the above-mentioned motion assisting wearing device in the related art, a force for holding the object or the members of the device will be reduced or dissipated. If such a situation occurs, the members are rapidly rotated by gravity, which might cause abrasion and breakage in the motion assisting wearing device.

The present invention has been made in light of the above circumstances, and it is an object of the present invention to reduce the energy consumed when a rotary apparatus such as a motion assisting wearing device is used and to suppress abrasion and breakage in the rotary apparatus and the driving apparatus which drives the rotary apparatus.

Means for Solving the Problem

In order to achieve the above object, provided according to an aspect of the present invention is a rotary adjustment apparatus comprising: a rotary apparatus which has a plurality of members coupled to each other via a plurality of rotation axes, the rotary apparatus providing a relative rotational movement of one of the members rotating around a rotation axis with respect to another one of the members; and a rotation restraining means which restrains at least one of a plurality of rotational movements provided by the rotary apparatus.

Provided according to another aspect of the present invention is a method of controlling a rotary apparatus which has a plurality of members coupled to each other via a plurality of rotation axes, the rotary apparatus providing a relative rotational movement of one of the members rotating around a rotation axis with respect to another one of the members, the method comprising: a rotation restraining step of restraining at least one of a plurality of rotational movements provided by the rotary apparatus.

When the configuration and the method described are employed, at least one of the plurality of rotational movements provided by the rotary apparatus can be restrained. For example, if a heavy object is held by the forearm member using a rotary apparatus which enables a rotation of the upper arm member with respect to the trunk member and a rotation of the forearm member with respect to the upper arm member, the rotational movement of the forearm member can be restrained in the state where the forearm member is rotated by 90° with respect to the upper arm. With such a configuration, since the upper arm member and the forearm member can function as if they were a single L-shaped member, the motive power for driving the forearm member becomes unnecessary. Accordingly, the consumption of energy (electrical power, etc.) required for driving the members can be reduced, and in addition, the lifetime of a driving apparatus (actuator) for driving the rotary apparatus can be extended.

Also, when the configuration and the method described above are employed, at least one of the plurality of rotational movements provided by the rotary apparatus can be restrained. Thus, even when it becomes impossible for the driving performance of the driving apparatus which drives the rotary apparatus to be adjusted due to a certain factor, the members can be restrained from being rapidly rotated by gravity. Accordingly, abrasion and breakage in the rotary apparatus can be reduced.

The rotation adjustment apparatus above may employ a rotary apparatus which comprises: a trunk member which is to be worn on a part near a shoulder of a wearer; an upper arm member which is coupled to the trunk member via a shoulder joint mechanism having at least one rotation axis and which is to be worn on an upper arm of the wearer; and a forearm member which is coupled to the upper arm member via an elbow joint mechanism having at least one rotation axis and which is to be worn on a forearm of the wearer, the rotary apparatus providing a rotational movement of the upper arm member with respect to the trunk member and a rotational movement of the forearm member with respect to the upper arm member. In such a configuration, a rotation restraining means which restrains at least one of the rotational movement of the upper member and the rotational movement of the forearm member may be employed.

The rotation adjustment apparatus (the method of controlling the rotary apparatus) above may also employ a rotation restraining means (rotation restraining step) which restrains at least one of the rotational movement of the upper arm member and the rotational movement of the forearm member when a predetermined command signal (e.g., a biosignal which is issued from the wearer and which exceeds a predetermined level and an operation signal generated as a result of a wearer's or another operator's operation of an operation unit) is detected.

The rotation adjustment apparatus (and the method of controlling the rotary apparatus) above may employ the rotary apparatus which comprises: a robot trunk member; a robot upper arm member which is coupled to the robot trunk member via a robot shoulder joint mechanism having at least one rotation axis; and a robot forearm member which is coupled to the robot upper arm member via a robot elbow joint mechanism having at least one rotation axis, the rotary apparatus providing a rotational movement of the robot upper arm member with respect to the robot trunk member and a rotational movement of the robot forearm member with respect to the robot upper arm member. In such a configuration, a rotation restraining means (rotation restraining step) which restrains at least one of the rotational movement of the robot upper arm member and the rotational movement of the robot forearm member may be employed.

The rotation adjustment apparatus may employ a rotation restraining means which restrains a relative rotational movement of one of the members with respect to another one of the members when a relative rotational angle of the one member with respect to the another one member exceeds a predetermined threshold value.

The rotation adjustment apparatus may employ a rotation restraining means which restrains at least one of a plurality of rotational movements provided by the rotary apparatus when a load applied on the rotary apparatus exceeds a predetermined threshold value.

The rotation adjustment apparatus above may employ a rotation restraining means which comprises: a recess provided in a rotary member which is fixed to and rotates with at least one rotation axis; and a pin which is configured so as to be inserted into and removed from the recess, the rotation restraining means preventing rotational movements of the rotary member and the rotation axis by inserting the pin in the recess.

The rotation adjustment apparatus above may employ a rotation restraining means which comprises: a plurality of protrusions provided on an outer circumference of a rotary member which is fixed to and rotates with at least one rotation axis; and a contact member which is arranged close to the protrusions so as to make contact with the protrusions of the rotary member, the rotation restraining means restraining rotational movements of the rotary member and the rotation axis by intermittently bringing the contact member into contact with the protrusions in such a state that the contact member is biased so as to be pressed against the protrusions which are being rotated.

The rotation adjustment apparatus above may employ a rotation restraining means having a friction brake which restrains at least one of a plurality of rotational movements provided by the rotary apparatus by applying a frictional force thereto. Examples of the friction brake which may be employed include a band brake, a drum brake and a disc brake. Also, examples of a friction brake which may be employed also include those restraining at least one of the plurality of rotational movements provided by the rotary apparatus using a friction force of a functional fluid whose viscosity varies due to an external physical influence (e.g., an ER fluid whose viscosity varies by externally applying an electrical field or an MR fluid whose viscosity varies by externally applying a magnetic field).

Effect of the Invention

According to the present invention, an energy consumed when a rotary apparatus such as a motion assisting wearing device is used can be reduced, and in addition, abrasion and breakage in the rotary apparatus and the driving apparatus which drives the rotary apparatus can be suppressed.

BEST MODE FOR CARRYING OUT THE INVENTION

Embodiments of the present invention will be described below with reference to the attached drawings. This embodiment describes an example where the present invention is applied to a "wearable motion assisting apparatus," which generates a necessary motive power at any time based on a wearer's intention.

First, with reference to FIGS. 1 to 4B, the configuration of a wearable motion assisting apparatus 1 according to this embodiment will be described.

The wearable motion assisting apparatus 1 detects a biosignal which is generated when a wearer P generates a muscle force, and generates a necessary motive power based on the detected biosignal. The wearable motion assisting apparatus 1 is called a robot exoskeleton or a powered exoskeleton. The wearable motion assisting apparatus 1 comprises: a motion assisting wearing device 10 which is to be worn by the wearer P; an actuator 20 which drives the motion assisting wearing device 10; a lock mechanism 30 which restrains a rotational movement of the motion assisting wearing device 10; angle sensors 40 which detect the rotation angles of members included in the motion assisting wearing device 10; load sensors 50 which detect a load applied on the members included in the motion assisting wearing device 10; biosignal sensors 60 which detect biosignals from the wearer P; a control apparatus 70 which centrally controls various devices in the wearable motion assisting apparatus 1; a battery (not shown) which supplies electrical power to various types of electronic equipment; and the like. The wearable motion assisting apparatus 1 serves as one embodiment of a rotation adjustment apparatus in the present invention.

As shown in FIGS. 2 and 3, the motion assisting wearing device 10 has: a trunk member 11 which is to be worn on the trunk of the wearer P; an upper arm member 13 which is coupled to the trunk member 11 via a shoulder joint mechanism 12 and which is to be worn on an upper arm of the wearer P; a forearm member 15 which is coupled to the upper arm member 13 via an elbow joint mechanism 14 and which is to be worn on a forearm of the wearer P; and the like, the motion assisting wearing device 10 achieving a rotational movement of the upper arm member 13 with respect to the trunk member 11 and a rotational movement of the forearm member 15 with respect to the upper arm member 13. In short, the motion assisting wearing device 10 is one embodiment of a rotary apparatus in the present invention.

As shown in FIGS. 2 and 3, the trunk member 11 is a member which covers the trunk of the wearer P from the wearer P's shoulders to waist. The trunk member 11 in this embodiment has a structure which achieves both: a strength capable of allowing a load, which has been transferred to the shoulder via the upper arm member 13, etc., to escape toward the lower body; and a flexibility capable of allowing the wearer P to twist the wearer P's trunk to the right and to the left or bend the wearer P's trunk back and forth.

As shown in FIGS. 2 and 3, the shoulder joint mechanism 12 comprises: an L-shaped member 12b which is rotatably coupled to the trunk member 11 via a rotation axis 12a extending in a vertical direction; and an I-shaped member 12d which is rotatably coupled to the L-shaped member via a rotation axis 12c extending in a horizontal direction. The shoulder joint mechanism 12 achieves two rotational movements around the two rotation axes 12a and 12c which are orthogonal to each other (a rotational movement of the L-shaped member 12b rotating around the vertical rotation axis 12a with respect to the trunk member 11 and a rotational movement of the I-shaped member 12d rotating around the horizontal rotation axis 12c with respect to the L-shaped member 12b). The shoulder joint mechanism 12 is provided with a shoulder part driving motor 21 which will be described later in detail.

As shown in FIGS. 2 and 3, the upper arm member 13 comprises: a first upper arm U-shaped member 13a which is fixed to the I-shaped member 12d of the shoulder joint mechanism 12 and which is to be worn on a part near the shoulder in the upper arm of the wearer P; a second upper arm U-shaped member 13b which is to be worn on a part near the elbow in the upper arm of the wearer P; and an upper arm rod member 13c which connects the first upper arm U-shaped member 13a and the second upper arm U-shaped member 13b to each other. Although not shown in FIGS. 2 and 3, the upper arm member 13 is provided with a belt for allowing the first upper arm U-shaped member 13a and the second upper arm U-shaped member 13b to be worn on the upper arm of the wearer P.

The upper arm rod member 13c is configured by mating a plurality of cylindrical members with each other so as to enable both: expansion/contraction; and twist (a rotation of one cylindrical member with respect to another cylindrical member). With such a configuration, the second upper arm U-shaped member 13b attached on one end of the upper arm rod member 13c can be twisted with respect to the first upper arm U-shaped member 13a attached on the other end of the upper arm rod member 13c, which enables the upper arm member 13 to follow a twisting motion of the upper arm of the wearer P.

As shown in FIGS. 2 and 3, the forearm member 15 comprises: a forearm U-shaped member 15a which is rotatably coupled to the second upper arm U-shaped member 13b of the upper arm member 13 and which is to be worn on a part near the elbow in the forearm of the wearer P; a wrist member 15b which is to be worn on a part near a wrist of the wearer P; and a forearm rod member 15c which connects the forearm U-shaped member 15a and the wrist member 15b to each other. Although not shown in FIGS. 2 and 3, the forearm member 15 is provided with a belt for allowing the forearm U-shaped member 15a and the wrist member 15b to be worn on the forearm of the wearer P.

The forearm rod member 15c is configured by mating a plurality of cylindrical members with each other so as to enable both: expansion/contraction; and twist (a rotation of one cylindrical member with respect to another cylindrical member). With such a configuration, the wrist member 15b attached on one end of the forearm rod member 15c can be twisted with respect to the forearm U-shaped member 15a attached on the other end of the forearm rod member 15c, which enables the forearm member 15 to follow a twisting motion of the forearm of the wearer P. Also, the wrist member 15b is configured so as to partly cover the back of a hand of the wearer P as shown in FIG. 3. With such a configuration, the wearer P can hold a heavy object.

As shown in FIGS. 2 and 3, the elbow joint mechanism 14 comprises: a rotation axis 14a which rotatably couples the second upper arm U-shaped member 13b of the upper arm member 13 and the forearm U-shaped member 15a of the forearm member 15 to each other, the elbow joint mechanism 14 achieving the rotational movement of the forearm member 15 rotating around the rotation axis 14a with respect to the upper arm member 13. The elbow joint mechanism 14 is also provided with an elbow part driving motor 22 which will be described later in detail.

As shown in FIGS. 2 and 3, the actuator 20 comprises: the shoulder part driving motor 21 provided in the shoulder joint mechanism 12; and the elbow part driving motor 22 provided in the elbow joint mechanism 14. The shoulder part driving motor 21 and the elbow part driving motor 22 are servomotors which are driven by electrical power supplied from the battery (not shown) and generate a driving torque in response to a control signal from the control apparatus 70.

The shoulder part driving motor 21 is fixed to the L-shaped member 12b of the shoulder joint mechanism 12 and drives the horizontally-extending rotation axis 12c with a necessary driving torque. By rotating the rotation axis 12c using the shoulder part driving motor 21, the I-shaped member 12d fixed to the rotation axis 12c (as well as the upper arm member 13 coupled to the I-shaped member 12d) makes a rotational movement with respect to the L-shaped member 12b (as well as the trunk member 11 coupled to the L-shaped member 12b). Such a driving torque from the shoulder part driving motor 21 assists a motion which the wearer P makes to move the wearer P's upper arm up and down with respect to the trunk (a rotational movement of the upper arm around a horizontally-extending virtual rotation axis). It is to be noted that since the rotation of the L-shaped member 12b around the vertically-extending rotation axis 12a in the shoulder joint mechanism 12 is permitted, a motion which the wearer P makes to rotate the wearer P's upper arm around the trunk (a rotational movement of the upper arm around a vertically-extending virtual rotation axis) can be permitted.

The elbow part driving motor 22 is fixed to the second upper arm U-shaped member 13b of the upper arm member 13 and rotates the rotation axis 14a of the elbow joint mechanism 14 with a necessary driving torque. By rotating the rotation axis 14a using the elbow part driving motor 22, the forearm U-shaped member 15a fixed to the rotation axis 14a (as well as the forearm member 15 including the forearm U-shaped member 15a) makes a rotational movement with respect to the second upper arm U-shaped member 13b (as well as the upper arm member 13 including the second upper arm U-shaped member 13b). Such a driving torque from the elbow part driving motor 22 assists a motion which the wearer P makes to rotate the wearer P's forearm with respect to the upper arm (bending and straightening motions of the elbow).

As shown in FIG. 1, the lock mechanism 30 is actuated in response to a control signal from the control apparatus 70 to restrain (prevent) the rotational movement of the forearm member 15 with respect to the upper arm member 13 in the motion assisting wearing device 10. The lock mechanism 30 comprises: a rotating plate 31 which is arranged on the outer side of the elbow part driving motor 22 and fixed to the rotation axis 14a, the rotating plate 31 thus rotating together with the rotation axis 14a; and pins 32 which are configured so as to protrude from the inner side of the elbow part driving motor 22 toward the rotating plate 31, as shown in FIGS. 4A and 4B. The rotating plate 31 is one embodiment of a rotary member in the present invention.

As shown in FIGS. 4A and 4B, an inner surface of the rotating plate 31 (the surface closer to the elbow part driving motor 22) is provided with a plurality of recesses 31*a* which are arranged along the outer circumference of the rotating plate 31. When the elbow part driving motor 22 generates a driving torque and rotates the rotation axis 14*a*, the rotating plate 31 fixed to the rotation axis 14*a* and the recesses 31*a* formed in the rotating plate 31 are rotated. The pins 32 are driven by pin driving parts 32*a* arranged inside the elbow part driving motor 22 as shown in FIG. 4B. The pin driving parts 32*a* are actuated in response to a control signal from the control apparatus 70 to drive the pins 32 so as to protrude from the inside of the elbow part driving motor 22 toward the outside. The pins 32 are normally housed inside the elbow part driving motor 22, but when the pin driving parts 32*a* are actuated in response to the control signal from the control apparatus 70, the pins 32 are protruded from the inside of the elbow part driving motor 22 toward the outside by the drive of the pin driving parts 32*a* and inserted into the respective recesses 31*a* formed in the rotating plate 31. Such an operation prevents the rotating plate 31 from rotating, and thereby preventing the rotations of the rotation axis 14*a* and the forearm member 15 coupled to the rotation axis 14*a*.

The angle sensors 40 are provided in the shoulder part driving motor 21 and the elbow part driving motor 22, and the angle sensors 40 detect the rotation angle of the upper arm member 13 (I-shaped member 12*d*) with respect to the trunk member 11 (L-shaped member 12*b*) and the rotation angle of the forearm member 15 with respect to the upper arm member 13, respectively. Information related to the rotation angles detected by the angle sensors 40 is used for a rotation restraint control for the motion assisting wearing device 10.

The load sensors 50 are provided at a suitable position in some members included in the motion assisting wearing device 10 (e.g., the trunk member 11, the upper arm member 13 and the forearm member 15) and detect a load applied on such members. Information related to the load detected by the load sensors 50 is used for the rotation restraint control for the motion assisting wearing device 10.

The biosignal sensors 60 detect biosignals from the wearer P. Examples of biosignals which may be employed include a neurotransmission signal representing the intention of the wearer P, a faint signal (electromyographic signal) which is generated in a skeletal muscle when the wearer P generates a muscle force, and various signals related to the body temperature, pulse, brain wave, cardiac potential, sweating, etc. of the wearer P. In this embodiment, the biosignal sensors 60 are attached to the upper arm and the forearm of the wearer P using adhesive tapes to detect electromyographic signals associated with the motions of the upper arm and the forearm. The biosignals detected by the biosignal sensors 60 are used for the control of the actuator 20 and the rotation restraint control for the motion assisting wearing device 10.

The control apparatus 70 centrally controls various devices in the wearable motion assisting apparatus 1, the control apparatus 70 being constituted from a CPU which carries out various types of computation, a memory which stores various types of control programs and control data, etc. As shown in FIG. 1, the control apparatus 70 comprises: a motive power controller 71 which controls the actuator 20 based on the biosignals detected from the biosignal sensors 60 and thereby generates a necessary assisting motive power; and a rotation restrainer 72 which actuates the lock mechanism 30 based on rotation angle information, load information, etc.

The motive power controller 71 generates a control signal for causing the actuator 20 (the shoulder part driving motor 21 and the elbow part driving motor 22) to generate a motive power according to the intention of the wearer P based on the biosignals (e.g., a neurotransmission signal and an electromyographic signal) detected by the biosignal sensors 60. The motive power controller 71 in this embodiment generates a current proportional to the level of a biosignal detected by the biosignal sensor 60, and generates a control signal for generating a driving torque proportional to the value of this current. Accordingly, the actuator 20 can be driven without lagging behind the wearer P's intention to make a motion, and thus the wearer P can make a motion according to the wearer P's intention without having an uncomfortable feeling.

The rotation restrainer 72 generates a control signal for actuating the lock mechanism 30 when any one of the following conditions are satisfied: (1) a rotation angle detected by the angle sensor 40 exceeds a predetermined threshold value and a biosignal detected by the biosignal sensor 60 exceeds a predetermined level; (2) a rotation angle detected by the angle sensor 40 exceeds a predetermined threshold value and a load detected by the load sensor 50 exceeds a predetermined threshold value; (3) a load detected by the load sensor 50 exceeds a predetermined threshold value and a biosignal detected by the biosignal sensor 60 exceeds a predetermined level; and (4) it becomes impossible for the drive performance of the actuator 20 to be adjusted due to a certain external factor (e.g., the shut-off of power supply).

In this embodiment, the threshold value of the rotation angle (the threshold value of the rotation angle of the forearm member 15 with respect to the upper arm member 13) which triggers the locking mechanism 30 to be actuated is set to "$\theta c$," and the threshold value of the load (the threshold value of the load applied on the forearm member 15) is set to "Nc." Also, in this embodiment, the level (a predetermined level) of a biosignal which triggers the lock mechanism 30 to be actuated is set to a level corresponding to a predetermined upper limit muscle force. The rotation restrainer 72 actuates the pin driving parts 32*a* of the lock mechanism 30 and prevents the forearm member 15 from rotating with respect to the upper arm member 13 when any one of the conditions (1) to (4) above is satisfied.

The rotation restrainer 72 and the lock mechanism 30 constitute an embodiment of a rotation restraining means in the present invention. The biosignal exceeding a predetermined level, which triggers the lock mechanism 30 to be actuated corresponds to a predetermined command signal in the present invention. It is to be noted that the rotation restrainer 72 temporarily stops power distribution to the elbow part driving motor 22 and thereby dissipates the driving torque while actuating the lock mechanism 30. With such a configuration, the power-saving effect to be described below can be obtained.

Next, a method related to a rotation restraint control for the wearable motion assisting apparatus 1 according to this embodiment (a method of controlling the motion assisting wearing device 10) will be described with reference to the flowcharts in FIGS. 5 to 7.

When the wearer P tries to lift up a heavy object, the motive power controller 71 in the control apparatus 70 generates a control signal for causing the actuator 20 to generate a motive power according to the intention of the wearer P based on a biosignal detected by the biosignal sensor 60. Since the actuator 20 is driven in response to the control signal without lagging behind the wearer P's intention to make a motion, the wearer P can make a lifting motion (a motion to bend the forearm) according to the wearer P's intention without having an uncomfortable feeling. When such a lifting motion is made, the rotation restrainer 72 in the control apparatus 70 achieves a rotation restraint control as will be described below.

Control which Refers to Angle and Biosignal

First, a rotation restraint control which refers to the rotation angle of the forearm member 15 and a biosignal will be described with reference to the flowchart in FIG. 5. The rotation restrainer 72 in the control apparatus 70 detects the rotation angle of the forearm member 15 with respect to the upper arm member 13 in the motion assisting wearing device 10 via the angle sensor 40 (angle detection step: S1). The rotation restrainer 72 also detects a biosignal from the wearer P via the biosignal sensor 60 (biosignal detection step: S2). The rotation restrainer 72 then judges whether or not the following condition is satisfied: the rotation angle detected in the angle detection step S1 exceeds a predetermined threshold value ($\theta c$) and the biosignal detected in the biosignal detection step S2 exceeds a predetermined level (judgment step: S3).

When determining that the rotation angle exceeds the predetermined threshold value and the biosignal exceeds the predetermined level in judgment step S3, the rotation restrainer 72 generates a control signal for actuating the lock mechanism 30, actuates the pin driving parts 32a to drive the pins 32 by outputting the control signal, and thereby prevents the rotational movement of the forearm member 15 (rotation restraint step: S4). Also, the rotation restrainer 72 temporarily stops power distribution to the elbow part driving motor 22 in rotation restraint step S4 and thereby dissipates the driving torque. On the other hand, in judgment step S3, when determining that the rotation angle is equal to or smaller than the predetermined threshold value, or, determining that the biosignal is equal to or lower than the predetermined level even though the rotation angle exceeds the predetermined threshold value, the rotation restrainer 72 ends the control without restraining the rotational movement of the forearm member 15.

Control which Refers to Angle and Load

Next, a rotation restraint control which refers to a rotation angle of the forearm member 15 and a load applied on the forearm member 15 will be described with reference to the flowchart in FIG. 6. The rotation restrainer 72 in the control apparatus 70 detects the rotation angle of the forearm member 15 with respect to the upper arm member 13 in the motion assisting wearing device 10 via the angle sensor 40 (angle detection step: S11). Also, the rotation restrainer 72 detects a load applied on the forearm member 15 via the load sensor 50 (load detection step S12). The rotation restrainer 72 then judges whether or not the following condition is satisfied: the rotation angle detected in the angle detection step S11 exceeds a predetermined threshold value ($\theta c$) and the load detected in the load detection step S12 exceeds a predetermined threshold value (Nc) (judgment step: S13).

When determining that the rotation angle exceeds the predetermined threshold value and the load exceeds the predetermined threshold value in judgment step S13, the rotation restrainer 72 generates a control signal for actuating the lock mechanism 30, actuates the pin driving parts 32a to drive the pins 32 by outputting the control signal, and thereby prevents the rotational movement of the forearm member 15 (rotation restraint step: S14). Also, the rotation restrainer 72 temporarily stops power distribution to the elbow part driving motor 22 in rotation restraint step S14 and thereby dissipates the driving torque. On the other hand, in judgment step S13, when determining that the rotation angle is equal to or smaller than the predetermined threshold value, or, determining that the load is equal to or smaller than the predetermined threshold value even though the rotation angle exceeds the predetermined threshold value, the rotation restrainer 72 ends the control without restraining the rotational movement of the forearm member 15.

Control which Refers to Load and Biosignal

Next, a rotation restraint control which refers to a load applied on the forearm member 15 and a biosignal will be described with reference to the flowchart in FIG. 7. The rotation restrainer 72 in the control apparatus 70 detects a load applied on the forearm member 15 in the motion assisting wearing device 10 via the load sensor 40 (load detection step: S21). The rotation restrainer 72 also detects a biosignal from the wearer P via the biosignal sensor 60 (biosignal detection step: S22). The rotation restrainer 72 then judges whether or not the following condition is satisfied: the load detected in the load detection step S21 exceeds a predetermined threshold value (Nc) and the biosignal detected in the biosignal detection step S22 exceeds a predetermined level (judgment step: S23).

When determining that the load exceeds the predetermined threshold value and the biosignal exceeds the predetermined level in judgment step S23, the rotation restrainer 72 generates a control signal for actuating the lock mechanism 30, actuates the pin driving parts 32a to drive the pins 32 by outputting the control signal, and thereby prevents the rotational movement of the forearm member 15 (rotation restraint step: S24). Also, the rotation restrainer 72 temporarily stops power distribution to the elbow part driving motor 22 in rotation restraint step S24 and thereby dissipates the driving torque. On the other hand, in judgment step S23, when determining that the load is equal to or smaller than the predetermined threshold value, or, determining that the biosignal is equal to or lower than the predetermined level even though the load exceeds the predetermined threshold value, the rotation restrainer 72 ends the control without restraining the rotational movement of the forearm member 15.

In the wearable motion assisting apparatus 1 according to this embodiment, in the situation where the wearer P holds a heavy object with the motion assisting wearing device 10 being operated, if a specific rotation restraint condition is satisfied (e.g., if the angle of the forearm member 15 with respect to the upper arm member 13 exceeds the predetermined threshold value and the load applied on the forearm member 15 exceeds the predetermined threshold value), the rotation restrainer 72 in the control apparatus 70 can prevent the rotational movement of the forearm member 15 by actuating the lock mechanism 30. Accordingly, since the upper arm member 13 and the forearm member 15 can function as if they were a single member, a motive power for driving the forearm member 15 becomes unnecessary. Thus, it becomes possible to reduce the consumption of power required to drive the members as well as to suppress abrasion and breakage in the actuator 20 which drives the motion assisting wearing device 10 and thereby extend the lifetime thereof.

In addition, in the wearable motion assisting apparatus 1 according to the above-described embodiment, the rotation restrainer 72 in the control apparatus 70 can restrain the rotation of each member in the motion assisting wearing device 10 by actuating the lock mechanism 30, when it becomes impossible for the drive performance of the actuator 20 to be adjusted due to a certain external factor. Accordingly, even when the driving force of the actuator 20 is suddenly reduced or dissipated, the members can be prevented from being rapidly rotated by gravity, and therefore abrasion and breakage in the motion assisting wearing device 10 can be reduced.

Next, the power saving effect which results from the application of the wearable motion assisting apparatus 1 according to this embodiment will be described with reference to the graph in FIG. 8.

FIG. 8 assumes a sequence of operations where the wearer P starts to hold an object with the motion assisting wearing device being actuated at time $T_0$, rotates the forearm member with respect to the upper arm member while holding the object, and stops the rotation at time $T_1$ when the rotation angle reaches a predetermined threshold value. If these operations are carried out using a wearable motion assisting apparatus having no lock mechanism in the related art, a driving torque required for holding the object must be continued to be generated even after the rotation is stopped (after time $T_1$), and thus large electrical power is consumed even after the rotation is stopped as shown by the dashed line in FIG. 8. By contrast, when the wearable motion assisting apparatus 1 according to this embodiment is used, the forearm member 15 is fixed to the upper arm member 13 by the lock mechanism 30 and power supply to the elbow part driving motor 22 is stopped after the rotation is stopped, and thus the consumption of electrical power is significantly reduced after the rotation is stopped as shown by the solid line in FIG. 8.

It is to be noted that the present invention is not limited to the embodiment above, and various modifications may be made without departing from the scope of the invention. For example, although the above embodiment has described an example in which the rotational movement is restrained with reference to a biosignal from the wearer P, conditions used for restraining the rotation are not limited thereto, and another configuration may be employed where an operation unit (e.g., a switch and a button), which a wearer, a caregiver or others (another operator) can operate, is provided and a rotational movement is prevented when an operation signal generated as a result of the wearer's or another operator's operation of the operating unit is detected. In such a configuration, the operation signal corresponds to a predetermined command signal in the present invention.

Although the above embodiment has described an example in which a rotational movement is restrained when two criteria are satisfied (e.g., a rotation angle exceeds a predetermined threshold value AND a biosignal from the wearer exceeds a predetermined level), the control method may be modified so that the rotational movement is restrained when one of these criteria is satisfied. Also, a configuration in which a rotational movement is prevented when an external force suddenly acts on the motion assisting wearing device due to a certain external factor may be employed.

Although the above embodiment has described an example in which the rotational movement of the forearm member 15 with respect to the upper arm member 13 is restrained by providing the elbow joint mechanism 14 with the lock mechanism 30, the shoulder joint mechanism 12 may be provided with a similar lock mechanism. By providing the shoulder joint mechanism 12 with the lock mechanism, a rotational movement of the L-shaped member 12b with respect to the trunk member 11 and a rotational movement of the I-shaped member 12d (as well as the upper arm member 13 coupled to the I-shaped member 12d) with respect to the L-shaped member 12b can be restrained.

Although the above embodiment has described an example employing a rotation restraining means having a lock mechanism, the configuration of the lock mechanism is not limited to the configuration of this embodiment which is shown in FIGS. 4A and 4B. Also, the configuration of the rotation restraining means is not limited to the configuration of this embodiment. For example, a rotation restraining mechanism as shown in FIG. 9 may be employed, where the outer circumference of the rotating plate 31 is provided with a plurality of teeth (teeth 31A provided on the side opposite to the motor 22 and teeth 31B provided on the side of the motor 22), and contact members 33A and 33B are arranged in such a manner that they are rotatable around axes 32A and 32B, respectively, so as to be close to the teeth 31A and 31B, the contact members 33A and 33B being intermittently brought into contact with the teeth 31A and 31B, respectively, thereby restraining the rotation of the rotating plate 31.

In the configuration where the above rotation restraining mechanism is employed, the rotation restrainer 72 of the control apparatus 70 can make a control so that biasing forces are applied to the contact members 33A and 33B so as to be pressed against the teeth 31A and 31B, respectively, when a predetermined rotation restraining condition is satisfied. With such a configuration, the rotational movement of the rotating plate 31 in the direction $R_1$ in FIG. 9 is restrained by the intermittent contact between the teeth 31A and the contact member 33A, while the rotational movement of the rotating plate 31 in the direction $R_2$ in FIG. 9 is restrained by the intermittent contact between the teeth 31B and the contact member 33B. The teeth 31A and 31B in such a rotation restraining mechanism serve as protrusions in the present invention. The above-described rotation restraining mechanism and the rotation restrainer 72 constitute an embodiment of the rotation restraining means in the present invention.

Although the above embodiment has described an example employing a rotation restraining means having a lock mechanism, the lock mechanism 30 may be replaced with a friction brake (e.g., a disc brake, a drum brake and a band brake) which generates a braking force for restraining the rotation of the rotation axis 14a of the elbow joint mechanism 14 in response to a control signal from the rotation restrainer 72 in the control apparatus 70. Since the rotational movement of the forearm member 15 with respect to the upper arm member 13 can be restrained by a frictional force when the rotation restrainer having such a friction brake is employed, the consumption of electrical power required for driving the forearm member 15 can be saved.

Alternatively, a friction brake, which generates a braking force for restraining the rotation utilizing a friction force caused by a functional fluid whose viscosity varies due to an external physical influence (e.g., an ER fluid whose viscosity varies by externally applying an electrical field and an MR fluid whose viscosity varies by externally applying a magnetic field), may be employed. Such a configuration employing a friction brake which utilizes a frictional force of a functional fluid can prevent the situation where the members are rotated rapidly by gravity because forces for holding an object and the members are suddenly dissipated (buffering action), even when it becomes impossible for the driving performance of the actuator to be adjusted due to a certain factor.

Although the above embodiment has described an example in which the present invention is applied to a motion assisting wearing device (rotary apparatus) which is to be worn on a human arm, a rotation control may be made by applying the present invention to a motion assisting wearing device which is to be worn on a human leg (which includes, for example: a waist member to be worn on a the waist of a wearer; a thigh member which is coupled to the waist member via a hip joint mechanism having at least one rotation axis and which is to be worn on a thigh of the wearer; and a shank member which is coupled to the thigh member via a knee mechanism having at least one rotation axis and which is to be worn on a shank of the wearer). In such a configuration, by providing a lock mechanism or the like in the hip joint mechanism or the knee joint mechanism and actuating the lock mechanism under the control of the control apparatus when, for example, a certain biosignal is detected, a rotational movement of the thigh member with respect to the waist member or a rotational movement of the shank member with respect to the thigh member can be restrained. In such a configuration, the control apparatus and the lock mechanism or the like constitute a rotation restraining means in the present invention.

Although the present embodiment has described an example in which the present invention is applied to a motion assisting wearing device (rotary apparatus) which is to be worn on a human body, the present invention may be applied to another rotary apparatus which makes a plurality of rotational movements. For example, a rotation control can be made by applying the present invention to a robot upper body structure (rotary apparatus) which comprises, for example: a robot trunk member; a robot upper arm member which is coupled to the robot trunk member via a robot shoulder joint mechanism having at least one rotation axis; and a robot forearm member which is coupled to the robot upper arm member via a robot elbow joint mechanism having at least one rotation axis. In such a configuration, by providing a lock mechanism or the like in the robot shoulder joint mechanism or the robot elbow joint mechanism and by actuating the lock mechanism or the like under the control of the control apparatus when a certain command signal is detected, a rotational movement of the robot upper arm member with respect to the robot trunk member and a rotational movement of the robot forearm member with respect to the robot upper arm member can be restrained. In such a configuration, the control apparatus and the lock mechanism or the like constitute a rotation restraining means of the present invention.

BRIEF DESCRIPTION OF THE DRAWINGS

FIG. 5 is a flow chart explaining a rotation restraint control for the wearable motion assisting apparatus in FIG. 1.

FIG. 6: Same as FIG. 5.

FIG. 7: Same as FIG. 5.

DESCRIPTION OF REFERENCE NUMERALS

Figure 1:
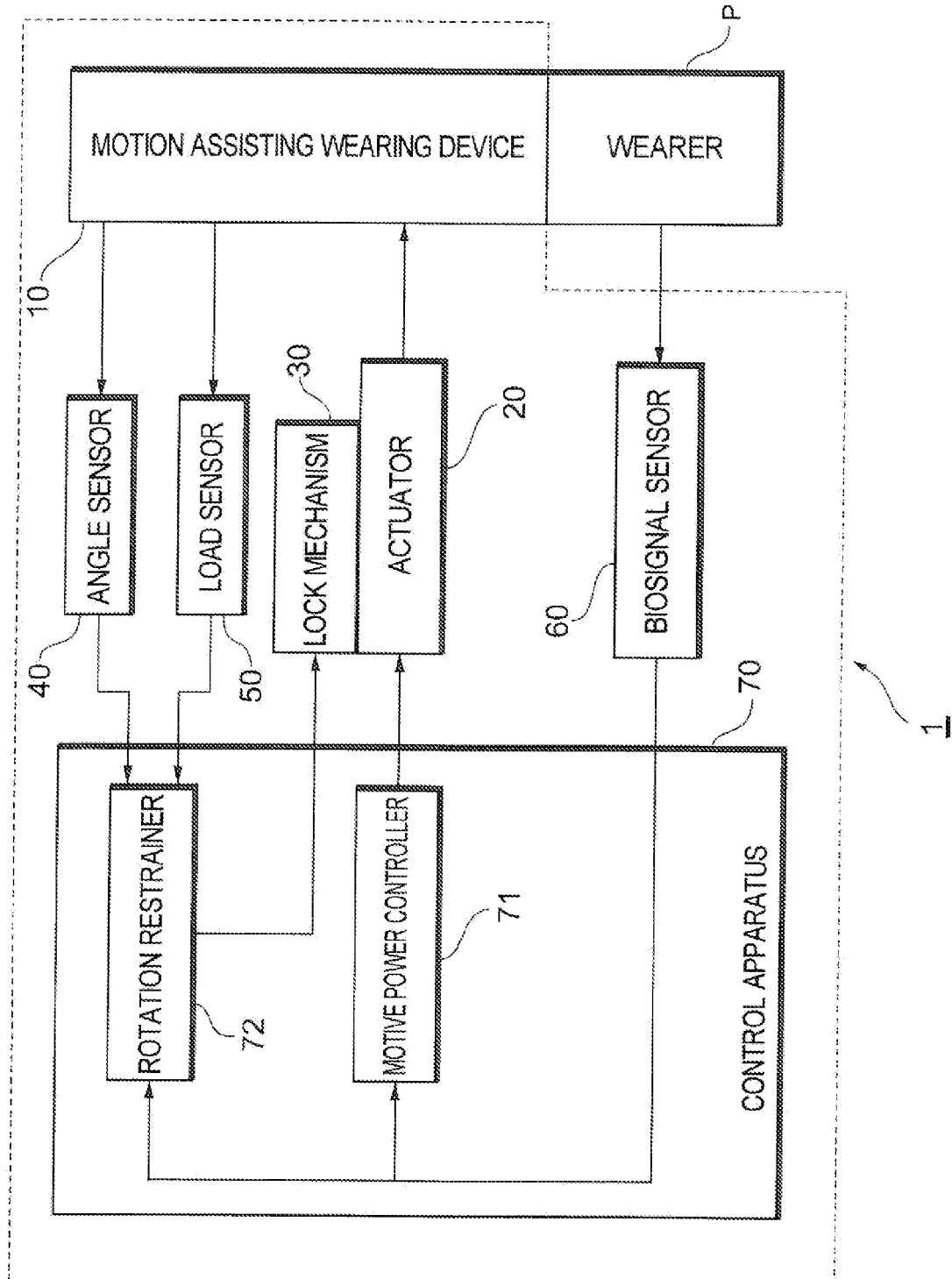
FIG. 1 is a block diagram showing the functional configuration of wearable motion assisting apparatus according to an embodiment of the present invention.
Figure 2:
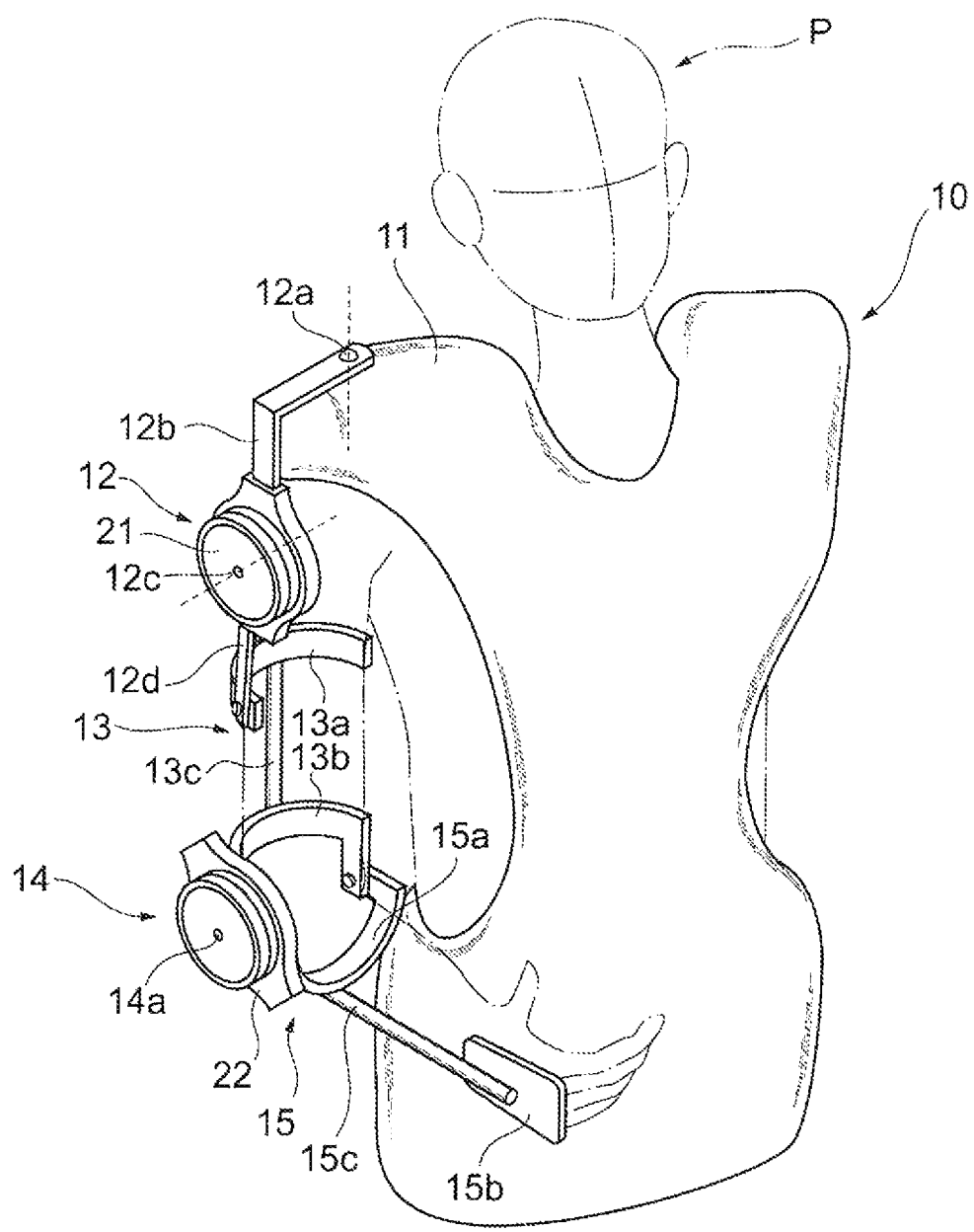
FIG. 2 is a perspective view showing a wearer wearing a motion assisting wearing device in the wearable motion assisting apparatus in FIG. 1, as seen from an angle from the front.
Figure 3:
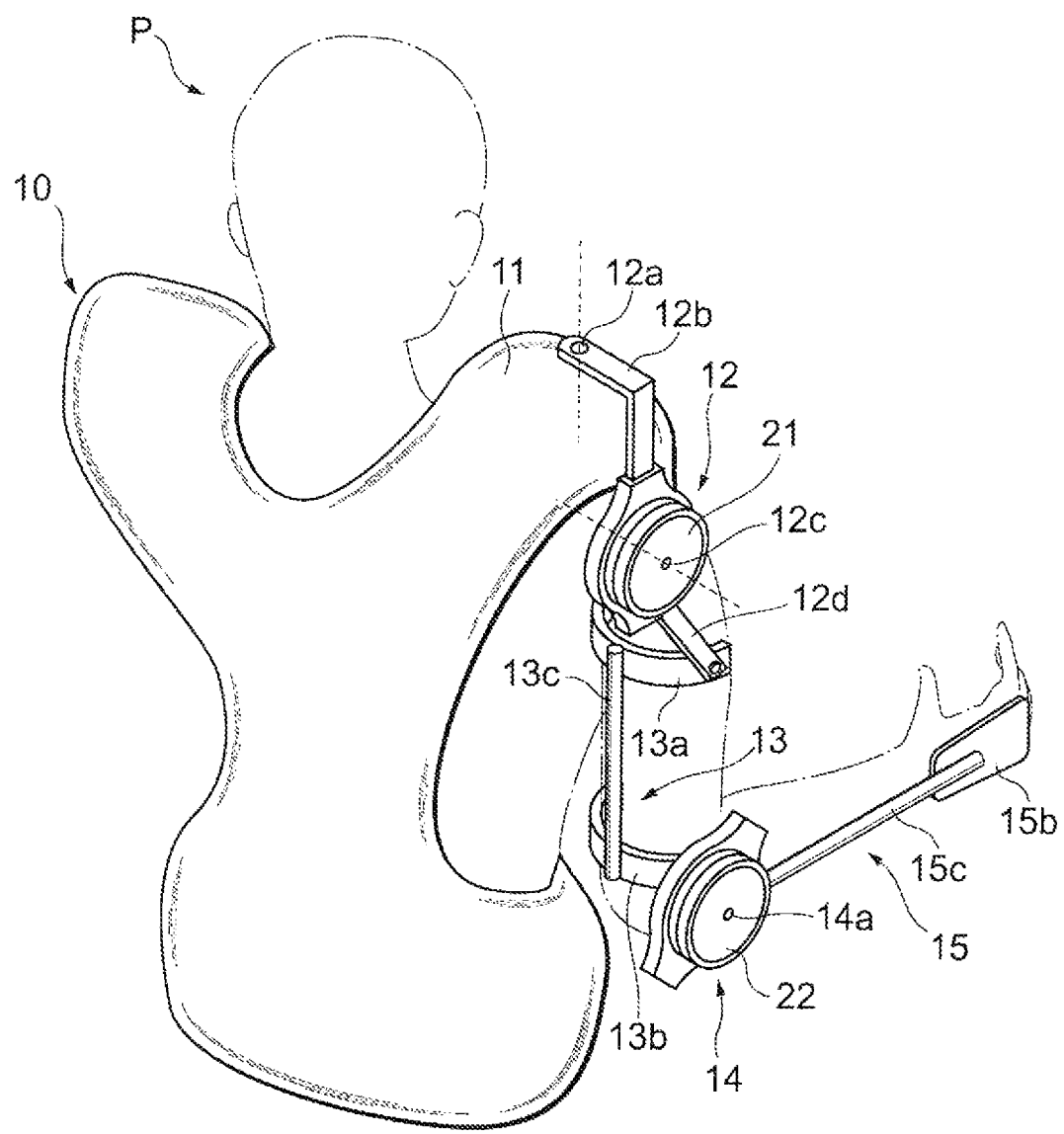
FIG. 3 is a perspective view showing a wearer wearing the motion assisting wearing device in the wearable motion assisting apparatus in FIG. 1, as seen from an angle from the back.
Figure 4A:
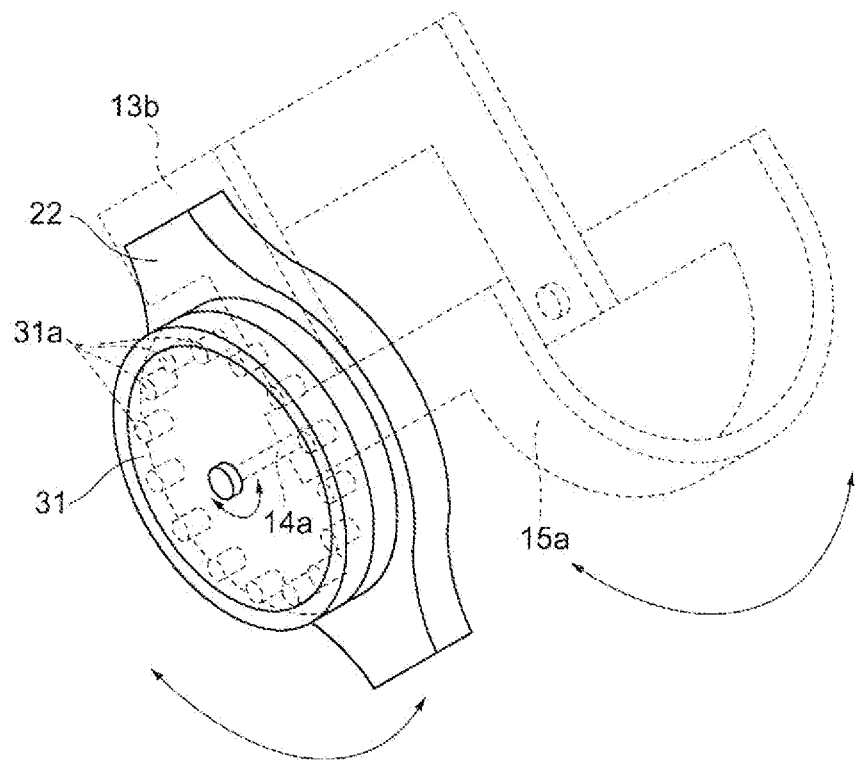
FIG. 4A is a perspective view showing a portion near an elbow part in the motion assisting wearing device which is provided with a lock mechanism in the wearable motion assisting apparatus in FIG. 1.
Figure 4B:
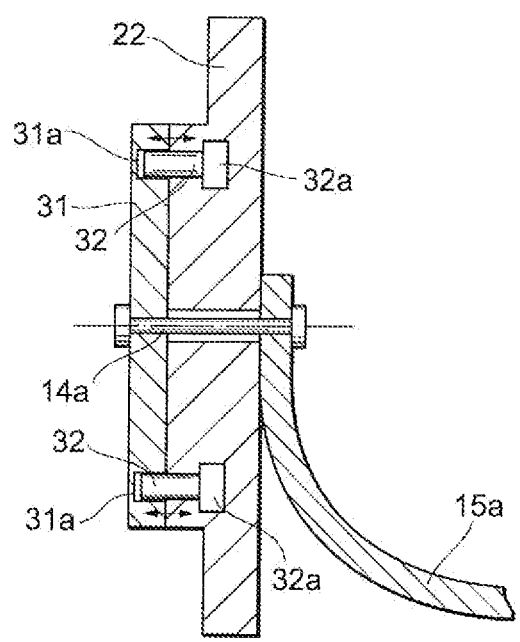
FIG. 4B is a cross sectional view showing the lock mechanism in the wearable motion assisting apparatus in FIG. 1.
Figure 8:
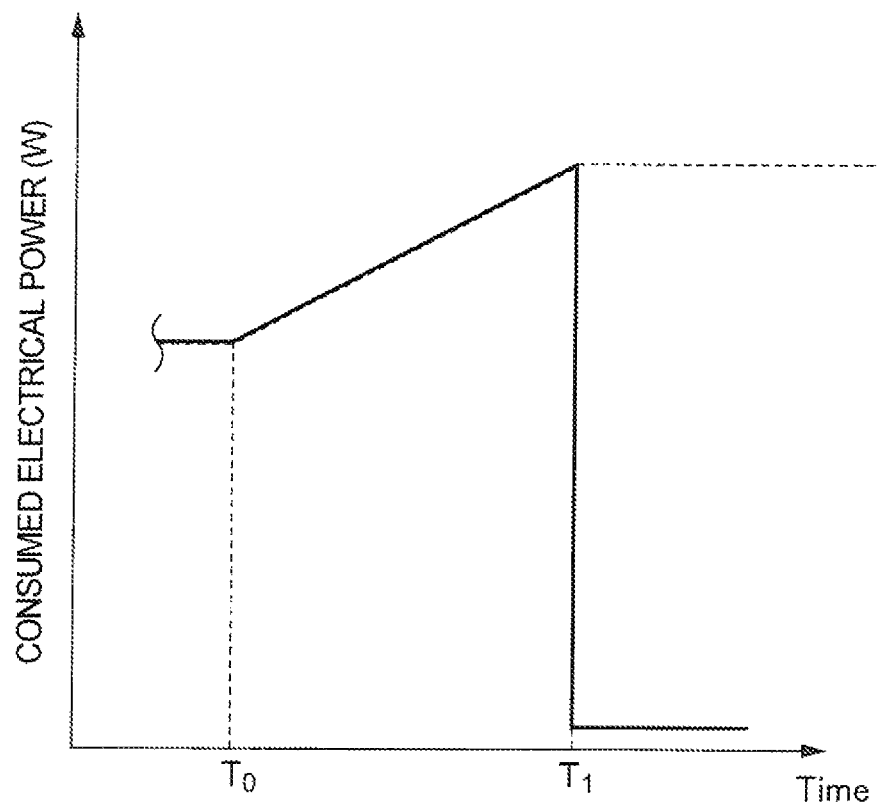
FIG. 8 is a graph showing a power-saving effect obtained when the wearable motion assisting apparatus in FIG. 1 is employed.
Figure 9:
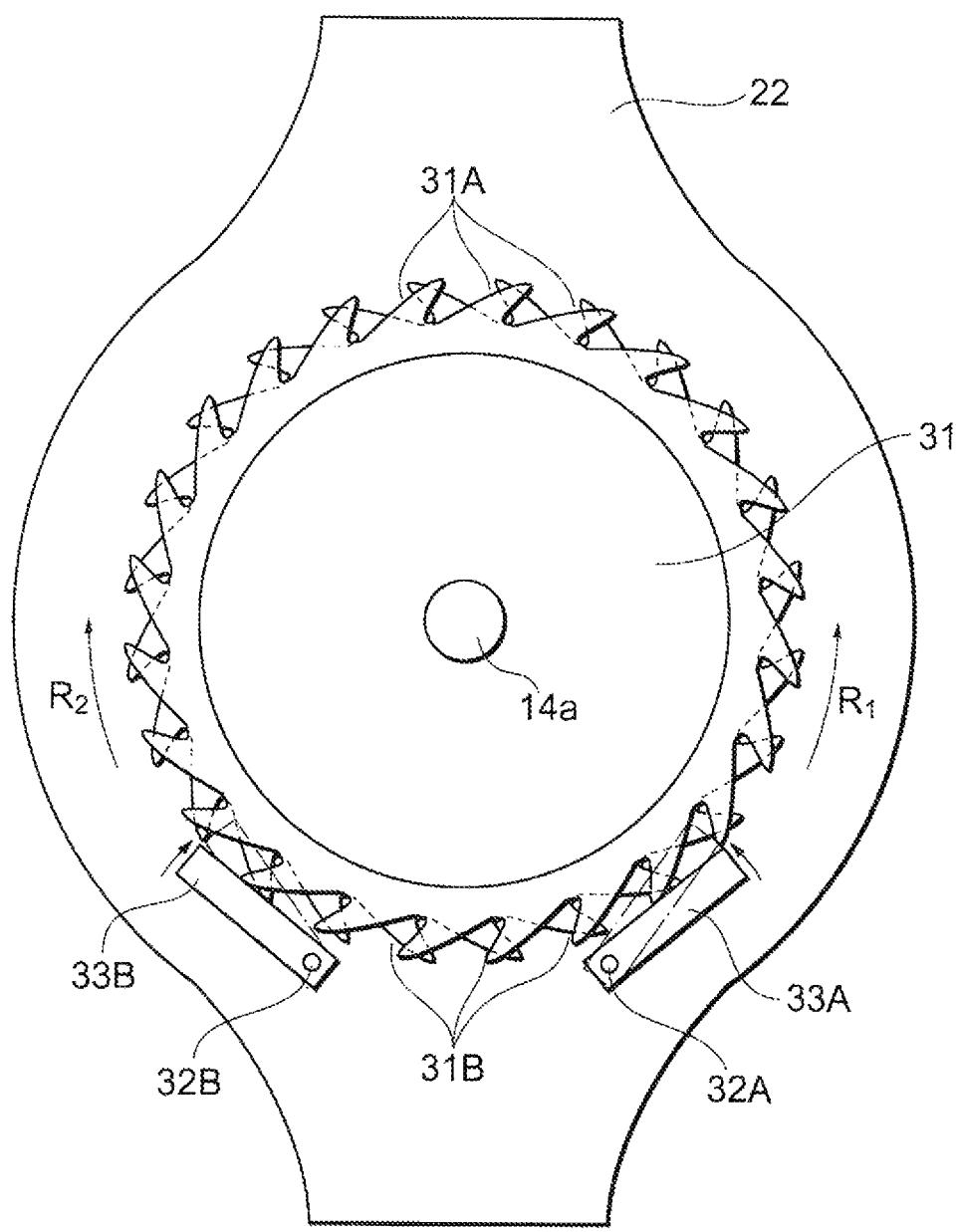
FIG. 9 is an illustration showing the configuration of another rotation restraining means in the wearable motion assisting apparatus in FIG. 1.

1: wearable motion assisting apparatus (rotation adjustment apparatus), 10: motion assisting wearing device (rotary apparatus), 11: trunk member, 12: shoulder joint mechanism, 12c and 12a: rotation axes; 13: upper arm member, 14: elbow joint mechanism, 14a: rotation axis, 15: forearm member, 30: lock mechanism (a part of a rotation restraining means), 31: rotating plate (rotary member), 31a: recess, 31A and 31B: teeth (protrusions), 32: pin, 33A and 33B: contact member, 72: rotation restrainer (a part of the rotation restraining means), P: wearer

What is claimed is:

1. A rotation adjustment apparatus, comprising:
a motion assisting wearing device including
a trunk member adapted to be worn on a part near a shoulder of a wearer;
an upper arm member which is coupled to the trunk member via a shoulder joint mechanism having two rotation axes and adapted to be worn on an upper arm of the wearer; and
a forearm member which is coupled to the upper arm member via an elbow joint mechanism and the forearm member having two rotation axes and adapted to be worn on a forearm of the wearer,
the motion assisting wearing device providing a rotational movement of the upper arm member with respect to the trunk member and a rotational movement of the forearm member with respect to the upper arm member; and
a first locking mechanism restraining the rotational movement of the upper arm member and a second locking mechanism restraining the rotational movement of the forearm member when a load applied on the motion assisting wearing device exceeds a predetermined threshold value and when a biosignal issued from the wearer exceeds a predetermined level and is detected;
the first locking mechanism and the second locking mechanism being independently operated,
the first locking mechanism and the second locking mechanism including a first plate and a second plate rotatably mounted on the first plate, the second plate having a plurality of recesses spaced about a periphery of the second plate, and the first plate including pins moving into and out of the plurality of recesses to lock the first plate and the second plate together when the load exceeds the predetermined threshold value and the biosignal exceeds the predetermined level.

2. A rotation adjustment apparatus, comprising:
a motion assisting wearing device including
a trunk member adapted to be worn on a part near a shoulder of a wearer;
an upper arm member which is coupled to the trunk member via a shoulder joint mechanism having two rotation axes and adapted to be worn on an upper arm of the wearer; and
a forearm member which is coupled to the upper arm member via an elbow joint mechanism and the forearm member having two rotation axes and adapted to be worn on a forearm of the wearer,
the motion assisting wearing device providing a rotational movement of the upper arm member with respect to the trunk member and a rotational movement of the forearm member with respect to the upper arm member; and
a first locking mechanism restraining the rotational movement of the upper arm member and a second locking mechanism restraining the rotational movement of the forearm member when a load applied on the motion assisting wearing device exceeds a predetermined threshold value and when a predetermined command signal is detected, the first locking mechanism and the second locking mechanism being independently operated;
wherein the command signal is an operation signal generated as a result of a wearer's or another operator's operation of an operation unit,
the first locking mechanism and the second locking mechanism including a first plate and a second plate rotatably mounted on the first plate, the second plate having a plurality of recesses spaced about a periphery of the second plate, and the first plate including pins moving into and out of the plurality of recesses to lock the first plate and the second plate together when the load exceeds the predetermined threshold value and the biosignal exceeds the predetermined level.

3. A method of controlling a motion assisting wearing device including a trunk member adapted to be worn on a part near a shoulder of a wearer; an upper arm member which is coupled to the trunk member via a shoulder joint mechanism having at least one rotation axis and adapted to be worn on an upper arm of the wearer; and a forearm member which is coupled to the upper arm member via an elbow joint mechanism having at least one rotation axis and adapted to be worn on a forearm of the wearer, the motion assisting wearing device providing a rotational movement of the upper arm member with respect to the trunk member and a rotational movement of the forearm member with respect to the upper arm member, the method comprising:
  a rotation locking step restraining at least one of the rotational movement of the upper arm member and the rotational movement of the forearm member, when a load applied on the motion assisting wearing device exceeds a predetermined threshold value and a biosignal which exceeds a predetermined level issued from the wearer is detected,
  wherein the rotation locking step being performed by a first locking mechanism restraining the rotational movement of the upper arm member and a second locking mechanism restraining the rotational movement of the forearm member when a load applied on the motion assisting wearing device exceeds a predetermined threshold value and when a biosignal issued from the wearer exceeds a predetermined level and is detected;
  the first locking mechanism and the second locking mechanism being independently operated,
  the first locking mechanism and the second locking mechanism including a first plate and a second plate rotatably mounted on the first plate, the second plate having a plurality of recesses spaced about a periphery of the second plate, and the first plate including pins moving into and out of the plurality of recesses to lock the first plate and the second plate together when the load exceeds the predetermined threshold value and the biosignal exceeds the predetermined level.

4. A method of controlling a motion assisting wearing device including a trunk member adapted to be worn on a part near a shoulder of a wearer; an upper arm member which is coupled to the trunk member via a shoulder joint mechanism having at least one rotation axis and adapted to be worn on an upper arm of the wearer; and a forearm member which is coupled to the upper arm member via an elbow joint mechanism having at least one rotation axis and adapted to be worn on a forearm of the wearer, the motion assisting wearing device providing a rotational movement of the upper arm member with respect to the trunk member and a rotational movement of the forearm member with respect to the trunk member and a rotational movement of the forearm member with respect to the upper arm member, the method comprising;
  a rotation locking step restraining at least one of the rotational movement of the upper arm member and the rotational movement of the forearm member, when a load applied on the motion assisting wearing device exceeds a predetermined threshold value and a predetermined command signal is detected,
  wherein the command signal is an operation signal generated as a result of a wearer's or another operator's operation of an operation unit,
  wherein the rotation locking step being performed by a first locking mechanism restraining the rotational movement of the upper arm member and a second locking mechanism restraining the rotational movement of the forearm member when a load applied on the motion assisting wearing device exceeds a predetermined threshold value and when the command signal is detected;
  the first locking mechanism and the second locking mechanism being independently operated,
  the first locking mechanism and the second locking mechanism including a first plate and a second plate rotatably mounted on the first plate, the second plate having a plurality of recesses spaced about a periphery of the second plate, and the first plate including pins moving into and out of the plurality of recesses to lock the first plate and the second plate together when the load exceeds the predetermined threshold value and the command signal is generated.

* * * * *